United States Patent [19]

Schiemann

[11] Patent Number: 4,552,175

[45] Date of Patent: Nov. 12, 1985

[54] ARRANGEMENT OF FUEL TANKS FOR VEHICLES

[76] Inventor: Wolfram Schiemann, Eugen-Nagele-Strasse 17, 7140 Ludwigsburg, Fed. Rep. of Germany

[21] Appl. No.: 624,410

[22] Filed: Jun. 25, 1984

[51] Int. Cl.[4] ............................................. F16K 24/00
[52] U.S. Cl. .................................... 137/571; 137/587; 137/590; 137/593
[58] Field of Search ............... 137/571, 572, 576, 587, 137/590, 593

[56] References Cited

U.S. PATENT DOCUMENTS

| | | | |
|---|---|---|---|
| 1,400,727 | 12/1921 | Codd | 137/571 |
| 1,410,104 | 3/1922 | Lindsey, Jr. | 137/576 X |
| 1,526,720 | 2/1925 | Satake | 137/571 |
| 2,531,847 | 11/1950 | Haley | 137/571 |
| 3,643,690 | 2/1972 | Sarai | 137/587 |
| 3,692,051 | 9/1972 | Eyb | 137/587 X |
| 3,749,124 | 7/1973 | Andres | 137/587 |
| 3,754,569 | 8/1973 | Fallotico | 137/572 |
| 3,960,174 | 6/1976 | Latimer et al. | 137/571 |
| 4,142,470 | 3/1979 | Zauss | 137/593 X |
| 4,287,913 | 9/1981 | Bennett et al. | 137/576 |

*Primary Examiner*—Alan Cohan
*Assistant Examiner*—John A. Rivell

[57] ABSTRACT

A reserve tank is built into the vehicle, and communicates with a filler pipe. A sleeve extends into the reserve tank, the upper end of which defines the reserve capacity, and the other end of which is connected with the inlet of the fuel tank. The contents of the reserve tank can be transferred readily into the fuel tank via a bypass with a valve. An expansion tank with a volume of at least 10% of the tank volume, is likewise connected with the fuel tank via a pipe. An air vent connection of the fuel tank and an air vent connection of the expansion tank are alternately connected with the atmosphere via valves controlled by a closure device, in such a way that, when the filler is open, the air vent connection of the fuel tank is opened, while the air vent connection for the expansion tank is shut. A non-return valve is incorporated in the passage which leads from the connection on the fuel tank via the expansion tank into the air vent connection for the expansion tank.

21 Claims, 3 Drawing Figures

ARRANGEMENT OF FUEL TANKS FOR VEHICLES

The invention relates to an arrangement according to which fuel tanks of vehicles have a built-in reserve tank.

BACKGROUND OF THE INVENTION

Many passenger vehicles carry a reserve can, so as not to be stranded on the road. At night, all gas stations have closed in large areas. On thruways you are liable to prosecution if you are stranded by running out of fuel. Many people take a can with them simply as a precaution. These cans are available with capacities of 5 and 10 liters. 5 liters last for journeys between 50 and 100 km, according to how you drive. This procedure has the following disadvantages:

1. The cans must be made so that they will pass severe tests. This costs money.
2. In choice of shape one is limited to flat shapes with rounded edges.
3. Cans which are not entirely full bulge out at high temperatures. They do indeed withstand this. However, a fuel can which has been distended like a balloon does not create a good impression with passengers.
4. When you open such a bulged can, it gives an unpleasantly hissing, frightening noise.
5. If you do not hold the can so that the outlet is uppermost, then, on release of the reduced pressure, fuel spurts out.
6. In order to save the costs of a reserve can, many people travel with totally unsuitable detergent containers and the like, instead of cans.
7. Even those cans which have passed the acceptance test permit hydrocarbons to pass through the wall in the course of time. If a reserve can is not checked from time to time, then after some time it no longer has its full contents.
8. A reserve can must itself be tied down, because otherwise it often flies from one side of the trunk to the other.
9. Just when you want it on holiday, the reserve can is at the bottom, under the baggage.
10. In families with more then one car, the reserve can may be forgotten.
11. Since the reserve can is loose, it can also be stolen.
12. Reserve cans of 10 liter capacity would in themselves be better than those of 5 liter capacity. But these are more difficult for weak or clumsy people to hold. Hence people often avoid 10 liter cans, even though by reason of the cube law they are nothing like twice as big as the 5 liter cans.
13. The cap on the filler pipe and on the can have to be unscrewed. In the excitement, people often forget to screw back one of them.
14. Every reserve can has a pouring spout, because the filler pipe is always so hidden that you cannot pour directly into it from the can. However, these spouts often become lost.
15. A certain experience and skill are needed to screw the spout onto the reserve can, and many people do not have this skill.
16. Often your very best cloths get dirty when you empty the reserve can.
17. If you have emptied the reserve can and do not think of it at the next gas station, so as to fill it up again, then you give yourself the deceptive hope that you have fuel in the reserve.
18. The filler pipes may be smooth-walled. Then all the fuel does indeed run out of them, and they stink only to a limited extent after use. But then the spout very often works like a lever, and the threaded portion is heavily overloaded. Otherwise, the spouts are of accordion type. Then indeed the thread is not overloaded. But then not all the fuel runs out of the spout, and after use a stench of fuel spreads through the trunk.
19. Because of the flat-faced shape of the reserve can, it is not possible to stow it in scarcely-usable recesses in the trunk space.

Because the can must be made according to DIN 16904, intermediate sizes such as, for example, 4½ liters or 7.8 liters are not possible. Rather, you have to make either 5 liter or 10 liter cans. As a solution of these problems, the construction set out in the preamble of the main claim has been proposed (German Pat. No. 3,225,351 A1). There is a reserve container built into the vehicle, which is necessarily filled up to its full reserve capacity via the normal filler pipe of the vehicle, on every occasion of filling up with fuel. The shape can be designed to fit into the vehicle, and the problems of separate cans are eliminated.

However, the known arrangement does not in all respects meet particular strict safety requirements in individual countries, such as, for example, the U.S.A.

OBJECT AND STATEMENT OF THE INVENTION

The object of the invention is thus to provide an arrangement of the kind mentioned at the beginning, that is also able to meet the strict safety requirements, while the expense and the cost are kept as low as possible and the installation into a vehicle shall be as simple as possible.

According to the invention this object is achieved by the improvement comprising:

(a) an expansion tank with a volume of at least 10% of the volume;

(b) a connection on the fuel tank, which lies below the lowest level of the expansion tank and above the maximum filling level in the fuel tank;

(c) a pipe leading from the lowest level of the expansion tank to the connection on the fuel tank;

(d) a second air vent connection, provided on the expansion tank above the lowest level of the expansion tank;

(e) a valve arrangement for alternatively connecting and shutting off the first and second air vent connections to the surrounding atmosphere;

(f) a closure device for the filler pipe, arranged and adapted to actuate the valve arrangement in such a way that, with the filler pipe open, the first air vent connection is open and the second air vent connection is shut, and (g) a non-return valve which shuts upon higher rate of outflow, provided in the path extending from the connection on the fuel tank through the expansion tank and into the second air vent connection.

The advantage of the invention lies especially in the fact that now an expansion space is ensured, so that, even with a totally filled fuel tank, a subsequent severe heating does not have the consequence that fuel flows into the atmosphere. Furthermore, the arrangement is also so safe that, even in the event of the vehicle overturning, it does not permit any fuel to escape. Advantageously, the invention includes the following additional features.

The filler communicates with a place in the reserve tank which is not in the catchment area of the upward opening sleeve. The quantity of fuel which flows in at the beginning is first entirely used to fill up the reserve tank, and only flows thereafter into the fuel tank.

If a part of this first quantity from the filler pipe were diverted, then, if only small quantities are put in, the reserve tank might not be totally filled.

The filler pipe is a tube, having a lower opening which lies below the level of the upper end of the sleeve. When the fuel tank has been filled, a greater fluid resistance arises in the filler pipe, and an automatic nozzle can respond to this.

The upper end of the bypass opens into the lowest point in the reserve tank. This ensures that the total reserve volume is used.

The reserve tank and the expansion tank are each in themselves a closed container. This offers the possibility of providing the expansion tank separately from the reserve tank, so that they can make better use of the spatial installation arrangements in a vehicle. But even if the two tanks are arranged directly beside one another, the disadvantage of this feature lies in the fact that the expansion tank, being distinct from the reserve tank, can be constructed of another material and/or of lesser wall thickness, because it is subject to a lesser loading than the reserve tank when filled with fuel.

The reserve tank and the expansion tank are arranged side by side and mounted above and the fuel tank, and the pipe on the expansion tank is connected with the connection on the fuel tank on the upper side of the fuel tank. The advantage that the two tanks are each connected independently of the other to the fuel tank, by which the layout of pipes is simplified and in particular the constructional height is reduced.

The sleeve has a portion that extends downwards outside the reserve tank and communicates with the inlet of the fuel tank; the reserve tank and the expansion tank are connected together side by side, and the lower end of the bypass and the pipe on the expansion tank each opens into said portion of the sleeve. A normal fuel tank can advantageously be used, which has only one inlet and one air vent connection.

A further constructional simplification arises when a container has a volume portion lying above the upwards opening end of the sleeve which provides the expansion tank, and a portion lying below the upwards opening end of the sleeve which provides the reserve tank; the sleeve also constituting a path from the expansion tank to the fuel tank.

A non-return valve which shuts upon higher rate of outflow, is incorporated in the path from the inlet of the fuel tank to the upwards opening end of the sleeve. Another non-return valve which shuts upon higher rate of outflow, is incorporated in the path from the connection of the fuel tank to the expansion tank. In another embodiment the non-return valve is incorporated in the path between the inlet of the fuel tank and the place where the lower end of the bypass opens into the sleeve. These features serve to resist overflow of the contents of the fuel tank into the reserve tank or the expansion tank, if the vehicle should overturn. Especially if the expansion tank is more weakly dimensioned, according to its normal function, it is protected from the non-return valve acts as a safety shut-off, which prevents total discharge of the fuel tank, in the case of one of the tanks being destroyed.

Further advantageous features of the invention result from other sub-claims, not considered above in detail.

DESCRIPTION ON THE DRAWINGS

The invention will be further described with reference to the exemplary embodiments shown in the drawings.

FIG. 1 shows a schematic sectional view through an arrangement according to a first development of the invention, FIG. 2 shows a side view, partly in section, of a second embodiment of the invention, and FIG. 3 shows a side view, partly in section, of a third embodiment of the invention.

DETAILED DESCRIPTION

Figure 1:
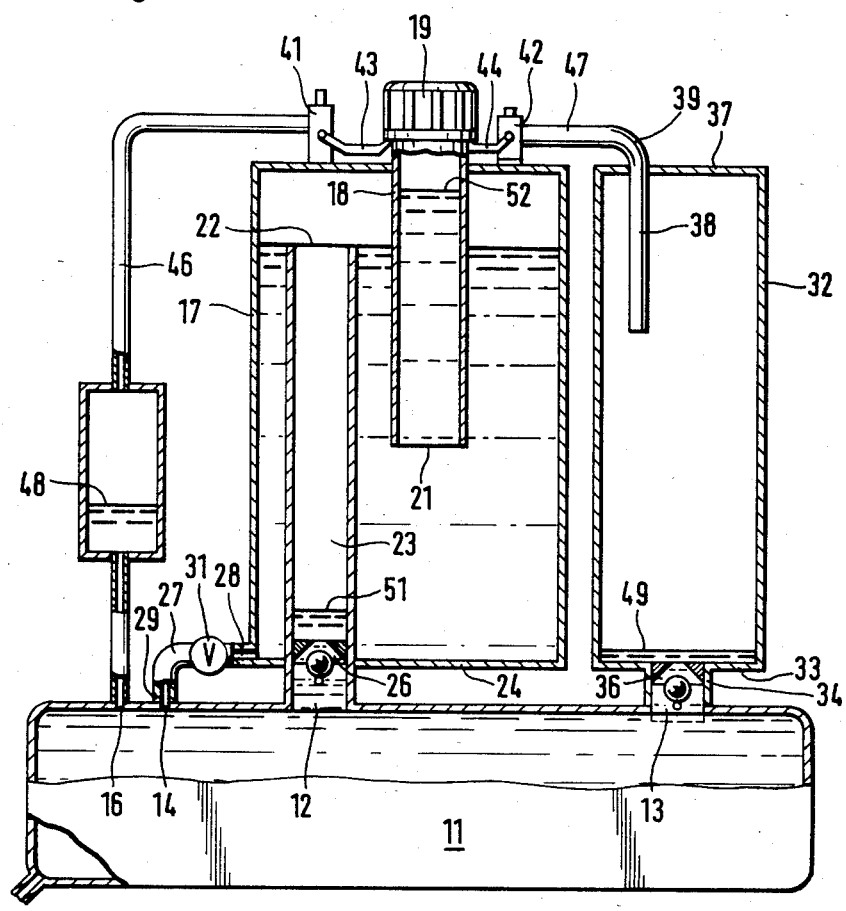

FIG. 1 shows a fuel tank 11 of special construction, which has in its upper side an inlet 12 and a further connection 13, as well as a small connection 14 and a first air vent connection 16. Above the fuel tank 11 is a reserve tank 17, which has in its upper side a filler pipe 18 with a closure device 19, for example in the form of a screw cap. The filler pipe 18 is formed as a tube, the lower opening 21 of which lies lower than the upper edge 22 of a sleeve 23, which extends upwards from below into the reserve tank 17, through the bottom wall 24. The height of the sleeve 23 within the reserve tank 17 determines the reserve volume. The lower end of the sleeve 23 is connected with the inlet 12 in a manner not shown in more detail. A non-return valve 26 is incorporated in the passage between the inlet 12 and the upper edge 22. This non-return valve is so constructed, that it blocks an outflow from the fuel tank 11, as soon as the rate of outflow exceeds a relatively low value.

There is a bypass pipe 27, the upper end 28 of which opens at a wall region of the reserve tank 17, which preferably corresponds to the deepest point. The lower end 29 of the bypass pipe 27 is connected with the small connection 14 of the fuel tank 11. A valve 31 is arranged in the bypass pipe 27, which automatically reaches a shut condition, and can be brought rapidly into an open condition either directly by hand operation or indirectly by remote control.

Alongside the reserve tank 17 there is also an expansion tank 32, from the lowest level of which, constituted by the bottom wall 33, a pipe 34 leads to the connection 13 of the fuel tank 11. In the embodiment shown, this pipe 34 is very short, and only so long that there is room in it for a non-return valve 36. A tubular member 38 extends from above through the upper wall 37, into the interior of the expansion tank 32. The end of the tubular member 38 extending outwards constitutes a second air vent connection 39.

In the neighbourhood of the filler pipe 18, two valves 41 and 42 are fixed on the reserve tank 17 in a manner not shown in detail. Each of these valves 41 and 42 possesses a control lever 43, 44 respectively, the front ends of which engage under the rim of the closure device 19. If, therefore, the closure device 19 is taken off the filler pipe 18 or put on again, this causes a changeover of the valves 41 and 42 by means of the control levers 43 and 44. The first air vent connection 16 is connected to the valve 41 by a suitable hose 46. The second air vent connection 39 is connected to the valve 42 by a hose 47. The air vent connections 16 and 39 respectively can now be alternately shut off or connected with the surrounding atmosphere, via the two valves 41 and 42. Here the arrangement is so chosen that, with the filler pipe 18 open, the valve 41 is opened, while with the closure device 19 on (as shown in FIG. 1), the valve 42 is opened and the valve 41 is shut.

The arrangement shown schematically in FIG. 1 can now be built into a vehicle in a suitable way. It can be made as a compact unit ready to operate, or alternatively the individual tanks can be installed at such places in the bodywork as are most suitable for optimum use of space.

The operation of the device will now be explained with reference to this schematic construction. It should first be assumed that the device is totally emptied. The filling operation begins with the removal of the closure device 19, in consequence of which the valve 41 opens and the valve 42 closes. Thereupon fuel is put in through the filler pipe 18. Since the lower opening 21 is laterally offset relative to the catchment area of the sleeve 23, the reserve space is first filled up. As soon as the liquid level reaches the lower opening 21 of the filler pipe 18, the remaining air in the interior of the reserve tank 17 can only escape via the sleeve 23, through the non-return valve 26, through a part of the fuel tank 11 to the first air vent connection 16 and through the hose 46 and the opened valve 41. As soon as the liquid has reached the level of the upper edge 22, such that the filling of the reserve space is finished, the fuel runs via the sleeve 23 and the non-return valve 26 into the fuel tank 11, while the displaced air can flow out of the fuel tank 11, likewise via the valve 41.

It should now be assumed that the fuel tank 11 has been totally filled, so that when the liquid begins to rise both in the hose 46 and also in the sleeve 23. For example, the fluid in the hose 46 reaches a level indicated by the reference number 48, the hose 46 being in communication with the atmosphere via the valve 41. This column of fluid extending above the upper edge of the fuel tank 11 exerts a certain pressure, which, according to the principle of communicating vessels, necessarily also creates an equally high fluid level in the sleeve 23 and in the expansion tank 32. But now the valve 42 is shut, so that the air in the interior of the expansion tank 32 cannot escape. For this reason, the liquid surface in the expansion tank can only rise as far as is possible in consequence of the compression of the trapped air. The level of liquid in the expansion tank in this condition is, for example, indicated by the reference number 49. But even in the sleeve 23, the fluid can only rise to the level indicated by the reference number 51, because in the part of the sleeve 23 above it there is a bubble of air trapped within the reserve tank 17. This air bubble is trapped, because the lower opening 21 of the filler pipe 18 is immersed in the liquid. Thus even here the trapped air is compressed to a certain extent, and this excess pressure in the interior of the reserve tank 17 also has the consequence that the liquid surface in the filler pipe 18 also rises above the level defined by the upper edge 22. The upper level in the filler pipe 18 is, for example, indicated by the reference number 52. This rising level now clearly indicates the full condition of the whole arrangement, and the accompanying back pressure induces an automatic nozzle, for example, to cut out, so that the filling operation is ended. Upon putting on the closure device 19, the valves 41 and 42 are changed over, so that now the entire arrangement is totally closed, except for the second air vent connection 39.

In this condition, the interior of the expansion tank 32 is connected with the surrounding atmosphere via the valve 42, so that now no excess pressure is present in the interior. Consequently, the level 49 will rise somewhat. If, furthermore, the fuel expands in consequence of stronger warming, then the greater fluid volume can without more ado be accepted in the expansion tank 32, which has a volume of at least 10% of the tank volume. If upon such an expansion of the fuel, the latter flows into the expansion tank, then such a limited escape velocity is present in the neighbourhood of the non-return valve 36, that the latter is not affected by it and continues in its open state.

Stricter safety requirements, particularly in the USA, now prescribe that, even in the case of overturning, no fuel should escape. This is ensured in the embodiment shown in FIG. 1. This can be seen most clearly, if the drawing is turned through 180°. In this position the fuel tank 11 is above the reserve tank 17 and above the expansion tank 32. The reserve tank 17 is totally closed by the closure device 19, so that no fuel can escape here. Since the valve 41 is closed, likewise no fuel can escape out of the first air vent connection 16. The only connection to the exterior is provided via the second air vent connection 39. Here the operation of the non-return valve 36 is now evident, for in this case it resists the fuel flowing out of the fuel tank 11 into the expansion tank 32, because this flow occurs considerably more suddenly than the normal expansion flow caused by temperature. If, however, a certain residual amount of fuel is present in the expansion tank 32, then this fluid collects in the neighbourhood of the upper wall 37 in the overturned position of the arrangement, and cannot reach the exterior via the opening of the tubular member 38 extending above it.

This test requirement set out above is on the assumption that the vehicle indeed turns over, but suffers no substantial damage. In practice, however, it must be reckoned that, in such an accident, components of the vehicle are damaged. In order to resist escape of a great quantity of fuel out of the fuel tank 11, in the case of damage to the reserve tank 17 or to the expansion tank 32, the two non-return valves 26 and 36 are arranged directly in the region of the inlet 12 and the further connection 13 respectively. The first air vent connection 16 can now also be protected in the same way with a similar non-return valve.

In normal operation, the arrangement behaves like every conventional fuel tank, but with the possibility that, by operation of the valve 31, the fuel from the reserve tank 17 can be transferred into the fuel tank 11 in an entirely reliable manner. The construction shown then ensures that, with communicating tanks, the reserve space is inevitably filled up first.

The reserve tank 17 is thus always filled about up to the level of the upper edge 22, and should therefore also be made correspondingly strong. Since the expansion tank 32 is mostly not filled, it can indeed be made less rigid than the reserve tank 17.

Figure 2:
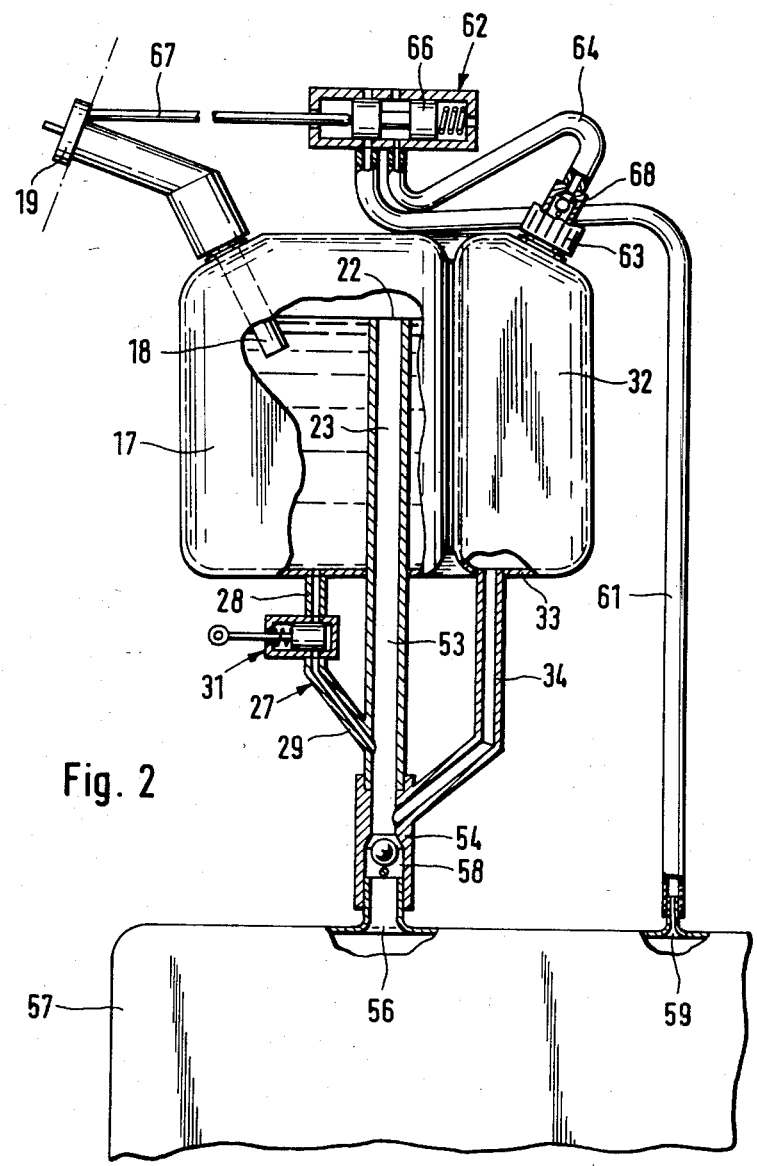

In the embodiment shown in FIG. 2, the same or similar parts are given the same reference numbers. Thus there is a reserve tank 17 here also, with the filler pipe 18 and the closure device 19 as well as the sleeve 23. Also present is the bypass pipe 27, with its upper end 28 and the lower end 29, and also the valve 31. The construction of this valve 31 is indicated here in schematic form. There is also an expansion tank 32 with the pipe 34 going out of its bottom wall 33. The sleeve 23 now has a downwardly extending part 53, into which open both the lower end 29 of the bypass pipe 27 and also the pipe 34. In the exemplary embodiment, the pipe 34 has a connector member 54, into which the inlet 56 of the fuel tank 57 can be inserted from below. The lower end of the part 53 is inserted from above into the connector member 54. Thus both the pipe 34, the sleeve 23 and the bypass pipe 27 communicate with the fuel tank 57 via this connector member 54. As a safety factor against an escape of fuel in the case of damage to the reserve tank 17 or to the expansion tank 32, a non-return valve 58 can be incorporated in the connector member 54, as shown in FIG. 2.

The fuel tank 57 now has only a first air vent connection 59, which leads via a hose 61 to a change-over valve 62. The expansion tank 32 has a second air vent connection 63, which leads to another connection of the change-over valve 62, via a hose 64. The two connections of the change-over valve 62 are respectively alternately closed and connected with the surrounding atmosphere by adjacent openings, by means of a piston 66. The piston 66 is moved by a schematically-indicated control lever 67, which is itself actuated by the closure device 19.

In order to resist an escape of fuel from the expansion tank 32 via the second air vent connection 63, the hose 64 and the open passage in the valve in case of overturning, in this exemplary embodiment a non-return valve 68 is incorporated in this flow channel, suitably directly at the connection to the expansion tank 32. Naturally such a non-return valve can also be provided in the example of FIG. 1, and then the pipe portion 38 can be omitted. The non-return valve 68 is indeed somewhat more expensive than a simple pipe portion according to FIG. 1, but it offers the advantage that greater safety against escape is ensured here in the case of overturning.

The operation of the device shown in FIG. 2 is in principle the same as has been explained with reference to FIG. 1.

The advantage of this variation lies in the fact that the reserve tank 17 and the expansion tank 32, with the bypass 27 and the pipe 34, as well as the part 53 and the connector member 54, constitute a unit ready for installation, which only has to be coupled up to the single inlet 56 of a conventional fuel tank 57. The first air vent connection 59, which is also present, is simply connected to the change-over valve 62 only. The inlet 56 corresponds in its function to the inlet 12, and at the same time to the connection 13 in FIG. 1.

Advantageously the reserve tank 17 and the expansion tank 32 can be produced in the way described, for example, in U.S. Pat. No. 3,724,987.

Figure 3:
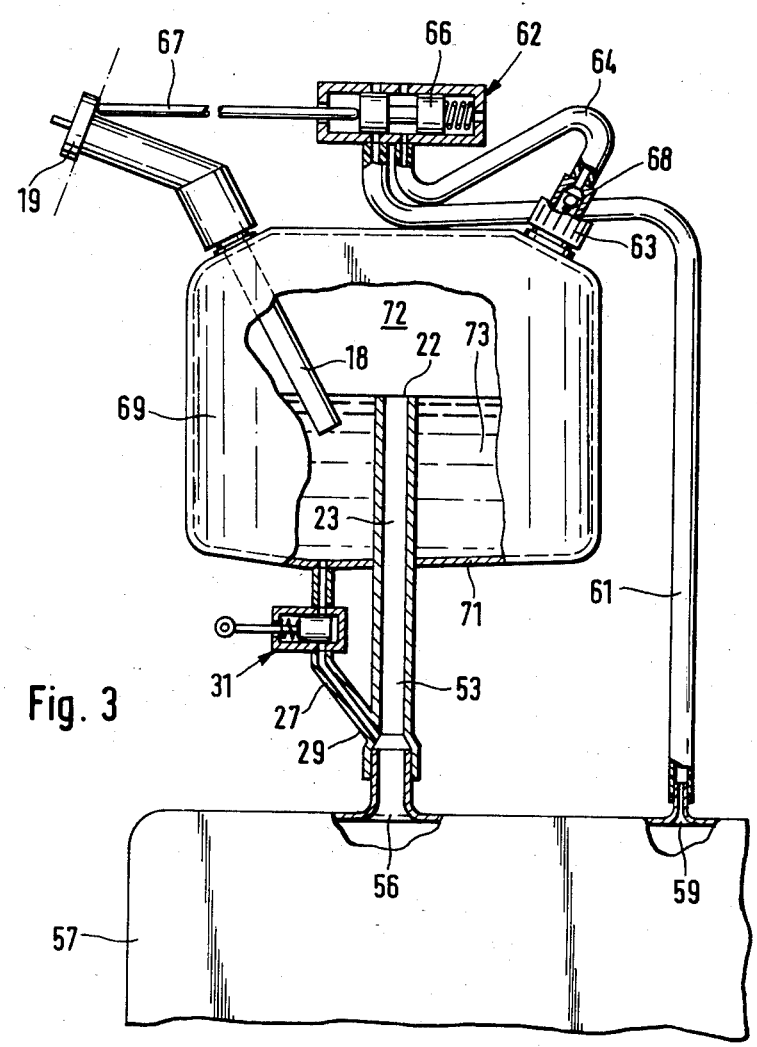

In the embodiment of the invention shown in FIG. 3, parts which correspond to those described in FIG. 2 are provided with the same reference numbers. Thus here, for example, are the same fuel tank 57 with only one inlet 56, and the first air vent connection 59. Also the change-over valve 62 with the piston 66, the control lever 67 and the hoses 61 and 64 corresponds to the construction previously described. In the same way there is, in analogous form, the non-return valve 68, the closure device 19 and the filler pipe 18, also the bypass 27 with the valve 31. The difference lies only in that here there is a single container 69, to the upper side of which are applied both the second air vent connection 63 and also the filler pipe 18. The sleeve 23 extends from below into the container through the bottom wall 71, and its upper edge 22, in comparison with FIG. 2, lies substantially deeper, so that the volume of the container 69 is subdivided into a sufficiently large expansion space 72 above this level, and a reserve space 73 below this level. Functionally the expansion space 72 corresponds to the expansion tank 32, and the reserve space 73 corresponds to the reserve tank 17. Thus the reserve space 73 could be referred to throughout as reserve tank.

The lower end 29 of the bypass 27 is also in this case connected with the part 53 of the sleeve 23, so that a single inlet 56 is sufficient for connection to the fuel tank 57. The sleeve 23 at the same time also assumes the function of the pipe 34 according to FIG. 2, because it likewise connects the expansion space 72 to the fuel tank 57.

In order that the expansion space 72 in this embodiment should not be flooded in a filling operation, the filler pipe 18 must, in this case, definitely extend below the level of the upper edge 22. Thus one ensures that the air in the expansion space 72 remains trapped, even with the closure device 19 removed. For in this condition the second air vent connection 63 is indeed closed by the change-over valve 62.

The mode of operation of the embodiment shown in FIG. 3 is as follows. Starting from the fully emptied condition, first the closure device 19 is opened, whereby the change-over valve 62 is changed over by means of the control lever 67. In this position, which does not correspond to the position illustrated, the first air vent connection 59 is then connected with the atmosphere. Upon filling with fuel, the reserve space 73 is filled up first, while the displaced air from the container 69 can first escape via the filler pipe 18. As soon as the filler pipe 18 is immersed in the liquid, the displaced air from the container 69 has to escape via the sleeve 23, the fuel tank 57 and the first air vent connection 59. As soon as the liquid level in the container 69 has reached the upper edge 22, the filling of the fuel tank 57 begins.

As soon as the fuel tank 57 has filled so far that the liquid begins to rise in the inlet 56, the same mechanism takes over as has been thoroughly explained with reference to FIG. 1. Since therefore the air trapped in the expansion space 72 can now no longer escape, a further supply of liquid causes a rise of the liquid column in the sleeve 23. This has the consequence that the air in the expansion space 72 is correspondingly compressed. This increased air pressure in the expansion space 72 now also causes a rise of the liquid surface in the filler pipe 18 or an increase in the back pressure in the filler pipe 18, which is detected by the sensor of an automatic nozzle and interrupts the filling operation.

In the embodiments of FIGS. 1 and 2 it is not absolutely necessary for the filler pipe 18 to reach below the level of the upper edge 22, if other indicating or switching means are provided for recognising the full condition of the fuel tank, which are not so located that the rising liquid surface is detected in the filler pipe 18. In the example of FIG. 3, it is however essential that the filler pipe 18 reaches to below the upper edge 22, because only by that means can it be ensured that the expansion space 72 is maintained.

The advantage of the embodiment shown in FIG. 3 lies in the simpler structural form as well as the more compact design. On the other hand, here it is absolutely necessary that the reserve space 73 and the expansion space 72 are positioned one above the other. In contrast, this requirement does not exist with the embodiments of FIGS. 1 and 2. There it is only necessary to fit in the tanks anywhere above the fiel tank, and the reserve tank can freely be installed at a different level from the expansion tank.

I claim:

1. Arrangements of fuel tanks for vehicles, comprising:
   an inlet to the fuel tank;
   a first air vent connection, provided on the fuel tank;
   a filler pipe;
   a piping arrangement leading from the filler pipe to the fuel tank;
   a walled reserve tank in the course of the piping arrangement, built into the vehicle and communicating with the filer pipe;
   a sleeve, having one end which is open upwards, and extending into the reserve tank, the height of the upwards open end within the reserve tank determining the reserve capacity, said sleeve passing through an opening in a wall of the reserve tank and having another end connected to the inlet of the fuel tank;
   a bypass, having an upper open end passing through a wall of the reserve tank below the upwards open end of the sleeve, and a lower end opening into the fuel tank;
   a valve in the bypass, which has an open condition and a shut condition and a return device in the valve for automatically returning the valve to the shut condition;
   and, the improvement comprising:
   (a) an expansion tank with a volume of at least 10% of the tank volume;
   (b) a connection on the fuel tank, which lies below the lowest level of the expansion tank and above the maximum filling level in the fuel tank;
   (c) a pipe leading from the lowest level of the expansion tank to the connection on the fuel tank;
   (d) a second air vent connection, provided on the expansion tank above the lowest level of the expansion tank;
   (e) a valve arrangement for alternatively connecting and shutting off the first and second air vent connections to the surrounding atmosphere;
   (f) a closure device for the filler pipe, arranged and adapted to actuate the valve arrangement in such a way that, with the filler pipe open, the first air vent connection is open and the second air vent connection is shut; and
   (g) a non-return valve which shuts upon higher rate of outflow, provided in the path extending from the connection on the fuel tank through the expansion tank and into the second air vent connection.

2. Arrangement as claimed in claim 1, wherein the filler pipe communicates with a place in the reserve tank which is not in the catchment area of the upward opening sleeve.

3. Arrangement as claimed in claim 2, wherein the filler pipe is a tube, having a lower opening which lies below the level of the upper end of the sleeve.

4. Arrangement as claimed in claim 1, wherein the upper end of the bypass opens into the lowest point in the reserve tank.

5. Arrangement as claimed in any one of claims 1 through 4 wherein the reserve tank and the expansion tank are each in themselves a closed container.

6. Arrangement as claimed in claim 5, wherein the reserve tank and the expansion tank are arranged side by side and mounted above the fuel tank, and the pipe on the expansion tank is connection with the connection on the fuel tank on the upper side of the fuel tank.

7. Arrangement as claimed in claim 6, wherein the fuel tank with the reserve tank and expansion tank mounted on it, as well as the filler pipe closure device, first and second air vent connections and valve arrangement, constitute a unit ready for installation.

8. Arrangement as claimed in claim 5, wherein the sleeve has a portion that extends downwards outside the reserve tank and communicates with the inlet of the fuel tank; the reserve tank and the expansion tank are connected together side by side, and the lower end of the bypass and the pipe on the expansion tank each opens into said portion of the sleeve.

9. Arrangement as claimed in claim 8, where the reserve tank, with the expansion tank, as well as filler pipe, closure device, second air vent connection and valve arrangement, constitute a unit ready for installation.

10. Arrangement as claimed in any one of claims 1 through 4 wherein a container has a volume portion lying above the upwards opening end of the sleeve which provides the expansion tank, and a volume portion lying below the upwards opening end of the sleeve which provides the reserve tank; the sleeve also constituting a path from the expansion tank to the fuel tank.

11. Arrangement as claimed in claim 10, wherein a portion of the sleeve extends downwards outside the container, and the lower end of the bypass opens into said portion.

12. Arrangement as claimed in claim 11, wherein the container, with filler pipe, closure device, second air vent connection, and valve arrangement constitute a unit ready for installation.

13. Arrangement as claimed in claim 6 wherein a second non-return valve which shuts upon higher rate of outflow, is incorporated in the path from the inlet of the fuel tank to the upwards opening end of the sleeve.

14. Arrangement as claimed in claim 6 wherein a second non-return valve which shuts upon higher rate of outflow, is incorporated in the path from the connection of the fuel tank to the expansion tank.

15. Arrangement as claimed in claim 8, wherein the non-return valve is incorporated in the path between the inlet of the fuel tank and the place where the lower end of the bypass opens into the sleeve.

16. Arrangement as claimed in any one of claims 1 through 4 wherein the reserve tank and the expansion tank are made of plastic.

17. Arrangement as claimed in any one of claims 1 through 4, wherein the valve arrangement comprises two separate valves and a central lever actuates each separate valve by means of the closure device.

18. Arrangement as claimed in any one of claims 1 through 4 wherein the valve arrangement consists of a combination change-over valve to which the first and second air vent connections are connected.

19. Arrangement as claimed in claim 10, wherein a second non-return valve which shuts upon higher rate of flow is incorporated in the path from the inlet of the full tank to the upwards opening end of the sleeve.

20. Arrangement as claimed in claim 10, wherein a second non-return valve which shuts upon higher rate of flow is incorporated in the path from the connection of the fuel tank to the expansion tank.

21. Arrangement as claimed in claim 13, wherein the second non-return valve is incorporated in the path between the inlet of the fuel tank and the place where the lower end of the bypass opens into the sleeve.

* * * * *